United States Patent Office 3,595,701
Patented July 27, 1971

3,595,701
STORAGE BATTERY CONNECTOR
Jack R. Lewis and John H. Dare, Norristown, Pa., assignors to Keystone Cable Corporation, Philadelphia, Pa.
Filed Aug. 20, 1969, Ser. No. 851,585
Int. Cl. H01m 5/00
U.S. Cl. 136—135R
3 Claims

ABSTRACT OF THE DISCLOSURE

A storage battery connector is provided having a body section with a tapered post, a polygonal central section for wrench engagement and a stud having an exposed threaded end and a concealed head which strengthens the body section.

BACKGROUND OF THE INVENTION

Field of the invention

This invention relates to an electric storage battery connector and more particularly to a connector for the connection of one type of electric storage battery cable connector to a storage battery requiring a different character of connector.

Description of the prior art

The almost universally employed type of storage battery terminals are of frusto-conical shape, may be of different diameter for the positive and negative terminals, and the cables for connection to the terminals are customarily provided with clamps having openings which are complemental to terminals, and many millions of said cables and clamps are now in use on automotive vehicles and in marine service.

It is now proposed to supply a new design of storage battery having threaded holes for connection of the cables. These new batteries while suited for installations designed specifically for these connections cannot readily be used with present storage battery powered electrical systems.

SUMMARY OF THE INVENTION

In accordance with the present invention an electric storage battery connector is provided, suitable for use with batteries having threaded holes for cable connection, whereby said storage batteries can be readily connected into electrical systems now in use.

It is the principal object of the present invention, therefore, to provide an electric storage battery connector which serves as an adapter for clamp type cable connections and batteries having threaded holes for the terminals.

It is a further object of the present invention to provide an electric storage battery connector which is strong, sturdy and simple in construction.

It is a further object of the present invention to provide an electric storage battery connector by which two sizes will accommodate a large number of electrical systems now in use.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a side elevational view of an electric storage battery connector in accordance with the invention.

FIG. 2 is a top plan view of the connector shown in FIG. 1.

FIG. 3 is a central sectional view, taken approximately on the line 3—3 of FIG. 2, and FIG. 4 is a bottom plan view of the connector shown in FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings the storage battery connector of the present invention is shown at 10 and includes a body portion 11.

The body portion 11 is preferably of lead, cast to shape and includes a frusto-conical portion 12 which for negative polarity connections may have the standard S.A.E. taper for negative battery terminals and for positive polarity connections may have the standard S.A.E. taper for positive battery terminals.

The frusto-conical portion 12 preferably has integral therewith a polygonal rim 14 disposed at the central region of the connector 10. The rim 14 may be of any desired shape but is preferably hexagonal and in a preferred embodiment will be $1\tfrac{3}{16}$ inch to accommodate a $1\tfrac{3}{16}$ inch hexagonal socket wrench.

The body portion 11 has embedded therein the head 20 of a stud 21, the head 20 being interiorly of the rim 14 and the contiguous part of frustoconical portion 12 and the threaded end 22 being exteriorly disposed. The stud 21 is coaxial with the portion 12.

The stud 21 can be of any desired material such as steel, brass, copper or aluminum alloy.

The stud 21 for a particular embodiment, and for a negative connector, can be $\tfrac{5}{16}$ inch stud with a hexagonal head 20 with 18 threads per inch and with about one half inch of the threaded end 22 exposed.

The stud 21 for another particular and related embodiment, and for a positive connector can be a $\tfrac{3}{8}$ inch stud with a hexagonal head 20, with 16 threads per inch and with about one half inch of the threaded end 22 exposed.

In use the threaded end 22 of proper size is energized in the battery opening turned by the application of a wrench on the rim 14 to the desired position. The head 20 of the stud 21 strengthens the rim 14 and contiguous parts of the body 11 and reduces the tendency of the soft metal of the body to distort or break upon the application of turning force on the rim 14.

The battery cable clamp (not shown) can then be applied on the tapered body portion 12 and tightened.

It will thus be seen that a simple, time saving and effective battery connector has been provided with which the objects of the invention are attained.

We claim:

1. An electric storage battery connector having
   a body portion,
   said body portion having an exteriorly frustoconical tapered end decreasing in diamenter toward its outer extremity and a central rim, and United States Patent Office 3,595,703
Patented July 27, 1971

3,595,703
METHODS OF IMPROVING THE DISCHARGE CAPACITY OF MANGANESE DIOXIDE USED IN THE CELL
Kazuhide Miyazaki and Michiaki Yamamoto, Tokyo, Japan, assignors to Mitsui Mining & Smelting Co., Ltd.
Filed Jan. 22, 1969, Ser. No. 793,072
Claims priority, application Japan, Aug. 17, 1968, 43/58,773
Int. Cl. H01m 15/00
U.S. Cl. 136—138                            10 Claims

ABSTRACT OF THE DISCLOSURE

The present invention provides methods of improving the discharge capacity of manganese dioxide used as a cathode active material in the dry cell by contacting said manganese dioxide with a carbamate. According to the methods provided in this invention, the discharge duration of a given quantity of manganese dioxide when used in the cell can be improved by means of simple measures and at a slight cost. The cell voltage of the dry cell using manganese dioxide prepared according to this invention accordingly drops off to a lesser extent during discharge, therefore the discharge capacity is increased and the service life of the cell is remarkably lengthened.

BACKGROUND OF THE INVENTION

(a) Field of the invention

The present invention relates to methods of improving the discharge capacity of manganese dioxide for dry battery use, wherein a carbamate or carbamates or a compound containing the carbamate is brought into contact, i.e., made to coexist with manganese dioxide when it is used as a cathode active material in the dry cell.

(b) Description of the prior art

As for conventional measures taken to improve the service life of the cell, there have been such measures as increasing the quantity of manganese dioxide used, and the enlargement of the surface areas of the manganese dioxide particles by finer pulverization. These are nothing more than measures based on increasing the reacting quantity of manganese dioxide, and are unsatisfactory from the standpoint of costs. Investigations as to the composition of the constituent elements of dry cells and the improvements of the construction and geometry of the cells have been made in the past. However, most of these measures have been limited to a narrow range of improvements such as the introduction of modifications to the ratio of conventional components comprising ammonium chloride, zinc chloride, acetylene black, graphite, etc., the choice of starch for making a paste, and the selection of agents with which the paper lining is to be soaked.

The concept of extending the service life of manganese dioxide substantially by eliminating lower oxides of manganese, or reaction products which are generated on the surfaces of manganese dioxide particles in the cell during the discharge and which shorten the service life as herein described is novel.

In a so-called manganese-alkaline dry battery in which a solution of strong alkali such as caustic potash is used as an electrolyte, the alkali has a slight solvent effect on some of the lower oxides produced by discharge, resulting in a relatively more improved utility of manganese dioxide than in the case of Leclanché cell, particularly in heavy drain service, and yet the alkali solution is quite insufficient to achieve elimination of lower oxides produced as the discharge proceeds. It is simply an electrolyte aiming at the "rechargeability" of manganese dioxide. Furthermore, the alkaline cell has the following drawbacks: the anode construction, which is made of zinc powder, is more complicated than that of a Leclanché cell; the positive and negative materials are assembled reverse to that of a Leclanché cell in order to raise the discharge capacity, with its manganese dioxide cathode and zinc powder anode arranged in so-called "inside-out" order; and the necessity of seal-up the construction to prevent the electrolyte from leaking out of the cell and the atmospheric air from coming ino the cell; all requiring much labor and cost in manufacturing the cell. The rechargeability, the last but the most important property of the cell, which was originally aimed at, has also not been realized commercially. Consequently, the result in the case of the manganese-alkaline cell has simply doubled or tripled the cost per discharge output of the cell as compared with the case of a Leclanché cell.

As mentioned in the foregoing, it has been presumed heretofore that the service life of the conventional dry cells could be lengthened remarkably if the layers of lower oxides could be eliminated successively from the surfaces of the manganese dioxide particles in action and the fresh $MnO_2$ phase inside of the particles be exposed to the electrolyte of the cell during discharge; however, the fact is that no substantial solution to the problem has been worked out and the matter has since been practically abandoned.

SUMMARY OF THE INVENTION

The objects of present invention are to provide the methods to improve the discharge capacity of manganese dioxide when used in the dry cell as a cathode active material; to provide simple and economic industrial methods to improve the cell performance of manganese dioxide; to provide manganese dioxide which shows excellent cell properties when used in the dry cell as cathode active material; to provide a cathode mixture component which shows an excellent performance when used in a cathode mixture of the dry cell; and to provide a dry cell of large discharge capacity, in which manganese dioxide is used as a cathode active material. According to the present invention, it has been possible to improve the cell properties of manganese dioxide by means of a simple method and at a low cost by making a carbamate or carbamates or a compound containing a carbamate salt coexist i.e. come into contact with manganese dioxide when used as a cathode active material in the dry cell. In the dry cell, in which manganese dioxide thus prepared is used, it has been observed that the attenuation of cell voltage decreases and the discharge capacity increases, and the service life of the cell has accordingly been lengthened remarkably.

BRIEF EXPLANATION OF THE DRAWINGS

The figures attached hereto show the cell performances in which the comparison is made by showing graphically the duration of discharge compared with the cell voltage using naturally occurring manganese dioxide ores and naturally occurring manganese dioxide ores treated according to the present invention. FIG. 1 and FIG. 2 show such comparisons in the cases of heavy discharge and light discharge respectively.

DESCRIPTION OF THE PREFERRED EMBODIMENTS

As for manganese dioxide to be used in the dry cell as a cathode active material, electrolytic manganese dioxide, chemically synthesized manganese dioxide, naturally occurring manganese dioxide ores, or a mixture of such manganese dioxides is generally used. Polarization, or the in the end, there is obtained a multidimensional cross-linked structure which has a high degree of self-support.

For this reason, polyelectrolytes which include in their chain or as substituents aromatic rings and which therefore are subject to particularly strong adsorption are the preferred polyelectrolytes.

If the active ion groups of the polyelectrolyte are carboxylate groups, the ions particularly preferred are, apart from zinc ions, alkaline-earth metal ions, aluminum ions and hydrogen ions.

For polyelectrolytes with sulfonate groups, it is possible to use also polyethyleneimine as precipitation agent.

As indicated, the final mass is highly compact and adapted for easy pressing and shaping and does not result in any sticking to the die faces. In addition it has excellent discharge properties. The latter are primarily due to tthe very good electrolyte distribution which results in an improved ion conductivity.

The polyelectrolyte in addition causes the wetting properties of the active mass to increase at the commencement of the mixing proceure which, in turn, results in a shortening of the wet mixing time.

It is important to note that with the depolarizer mass of the invention even overextended wet mixing periods are hardly critical in view of the addition of the polyelectrolyte.

The following is an exampe of the invention.

A mass was set up from the following components:

87 wt. parts of manganese dioxide;
13 wt. parts of acetylene black;
40 wt. parts of a 2% aqueous solution of amide groups containing ammonium polyacrylate.

These components were thoroughly mixed until no dusting of the mass occurred. Thereafter, 40 wt. parts of a 70% zinc chloride solution were added and the mixing was continued until all components had been uniformly distributed.

In all these cases it appears that the filamentary molecules of the polyelectrolyte are cross-linked by multivalent cations. The cations form part of the principal electrolyte. However, it is also possible to add a second polyelectrolyte of opposite ion charge and, likewise, hydrogen ions may also be used.

List and formulas of preferred polyelectrolytes
(1) Ammonium polyacrylate

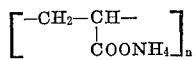

(2) Amide groups containing ammonium polyacrylate

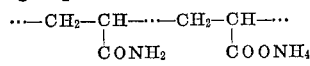

(3) Sodium polystyrene sulfonate

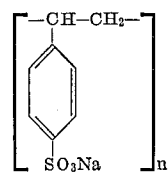

(4) Polyethyleneimine

$n = 50$–$50,000$ preferably $500$–$20,000$.

What is claimed is:
1. A process of making a depolarizer-electrolyte mass for primary cells adapted for being set up within a wide range of stirring and mixing times and mixing force, the said process comprising the steps of adding a polyelectrolyte in the form of a non-cross-linked linear polymer to a conductivity agent containing depolarizer mass, mixing the two components together upon agitation, then adding, upon furhter agitation, a solution of a principal electrolyte containing ions adapted to act as cross-linking agents for said polyelectrolyte and causing the said ions in the principal electrolyte to cross-link and precipitate the said first polyelectrolyte.

2. The process of claim 1, wherein the principal electrolyte is an aqueous solution of a compound furnishing zinc, magnesium or aluminum metal ions.

3. The process of claim 1, wherein the polyelectrolyte is an aqueous solution of an amide group containing non-cross-linked ammonium polyacrylate.

4. The process of claim 1, wherein the principal electrolyte is an aqueous zinc chloride solution.

5. The process of claim 1, wherein the polyelectrolyte is a non-cross-linked polystyrene sulfonate.

6. The process of claim 1, wherein the polyelectrolyte is added to the dry depolarizer mass containing the conductivity agent in an amount between 0.2 and 2% by weight.

7. The process of claim 1, wherein the said ions in the principal electrolyte are polyions of a second polyelectrolyte which polyions are of opposite polarity to the polyions of the first polyelectrolyte.

8. The process of claim 7, wherein the second polyelectrolyte is a polyethyleneimine.

9. A stir-proof active depolarizer-electrolyte mass for use in primary cells comprising an oxide depolarizer composition, a conductivity agent distributed therein, a cross-linked polyelectrolyte finely distributed throughout said depolarizer composition and a principal electrolyte, the principal electrolyte comprising the cross-linking agent of said polyelectrolyte.

10. The depolarizer-electrolyte mass of claim 9 wherein the polyelectrolyte is a polyacrylate or polystyrene sulfonate.

11. The depolarizer-electrolyte mass of claim 9, wherein the cross-linking agent is a polyvalent metal ion furnished by the principal electrolyte.

12. The depolarizer-electrolyte mass of claim 9, wherein the polyelectrolyte is an amide group-containing ammonium polyacrylate and the principal electrolyte is zinc chloride solution.

13. The depolarizer-electrolyte mass of claim 9, wherein the depolarizer is manganese dioxide.

14. The depolarizer-electrolyte mass of claim 9, wherein tthe conductivity agent is carbon black, acetylene black or graphite.

References Cited

UNITED STATES PATENTS 3,257,242  6/1966  Euler et al. _____ 136—138X
3,306,781  2/1967  Siller _____ 136—138

DONALD L. WALTON, Primary Examiner

U.S. Cl. X.R.

136—138, 139, 157 present invention had its service life lengthened by 30% in comparison with the conventional dry cell constructed with the same electrolytic manganese dioxide without applying the improved method of the present invention.

TABLE 2.—EFFECT ACHIEVED BY ADDING AMMONIUM CARBAMATE

|  | Heavy discharge capacity, hours | Light discharge capacity, hours |
|---|---|---|
| Dry cell according to present invention | 15 | 220 |
| Conventional dry cell | 12 | 170 |

EXAMPLE 3

When a dry cell was constructed with such mixture composition as provided in Table 1: wherein chemically synthesized manganese dioxide was immersed in the aqueous solution of ammonium carbamate, filtered off and dried; then manganese dioxide was made to contain 0.5–2.0% by weight of ammonium carbamate based on mangnaese dioxide; the dry cell constructed according to the present invention increased in discharge capacity by 40% over the conventional dry cell, which was constructed by the use of the same chemically synthesized manganese dioxide without applying the carbamate process provided by the present invention, as shown in Table 3.

TABLE 3.—EFFECT ON DISCHARGE CAPACITY OF CHEMICALLY SYNTHESIZED MANGANESE DIOXIDE CONTAINING CARBAMATE

|  | Heavy discharge capacity, hours | Light discharge capacity, hours |
|---|---|---|
| Chemically synthesized manganese dioxide according to the present invention | 15 | 220 |
| Conventional chemically synthesized manganese dioxide | 11 | 160 |

EXAMPLE 4

In constructing a dry cell by the use of electrolytic manganese dioxide, 2% ammonium carbonate powder which contained about 50% ammonium carbamate was directly added and mixed with manganese dioxide in the same mixture composition as mentioned in Table 1.

The service life of the cell in this case is shown in Table 4, and the duration of discharge until the cut-off voltage of 0.75 volt was lengthened by approximately 30% with the dry cell, whose cell properties had been improved according to the present invention.

TABLE 4.—EFFECT ACHIEVED BY THE ADDITION OF AMMONIUM CARBONATE CONTAINING AMMONIUM CARBAMATE

|  | Heavy discharge capacity, hours | Light discharge capacity, hours |
|---|---|---|
| Dry cell according to the present invention | 15 | 220 |
| Conventional dry cell | 12 | 170 |

"Conventional dry cell" mentioned in the above table is as same as one defined in Example 2.

What is claimed is:

1. A cathode mixture composition for use in a dry cell which contains manganese dioxide as a principal ingredient, acetylene black, graphite, zinc chloride and containing admixed therein about from 0.01 to 10%, by weight of manganese dioxide, of at least one compound selected from the group consisting of carbamates and compounds containing carbamate as an additional ingredient.

2. A dry cell comprising a cathode mixture composition which contains manganese dioxide as a principal ingredient, acetylene black, graphite, zinc chloride and containing admixed therein about 0.01 to 10%, by weight of manganese dioxide, of at least one compound selected from the group consisting of carbamates and compounds containing carbamate as an additional ingredient.

3. A cathode active material for use in a dry cell, which comprises manganese dioxide particles containing admixed therein about from 0.01 to 10% by weight, based on the weight of manganese dioxide, of at least one compound selected from the group consisting of ammonium carbamate, potassium carbamate, sodium carbamate and ammonium carbonate containing ammonium carbamate, thereby increasing the discharge capacity of the dry cell when said material is used in the dry cell as the cathode active material.

4. A cathode active material according to claim 3, wherein said compound is contained in said manganese dioxide particles in the form of an aqueous solution, thereby impregnating said compound into said manganese dioxide particles.

5. A cathode active material according to claim 3, wherein said compound is contained in said manganese dioxide particles in the form of a powder.

6. A cathode active material according to claim 3, wherein said compound is contained in said manganese dioxide particles in the form of an alkaline solution containing dissolved therein said compound with an alkali selected from the group consisting of sodium carbonate, potassium carbonate, caustic soda and caustic potash, thereby impregnating said compound into said manganese dioxide particles.

7. A method of improving the cell performance of particulate manganese dioxide for use as principal ingredient in a cathode mixture of a dry cell which comprises the step of contacting said manganese dioxide with a carbamate to form carbamate treated manganese dioxide particles containing 0.01% to 10.0% by weight of carbamate, based on the weight of manganese dioxide, and incorporating said treated manganese dioxide in a dry cell.

8. The method of claim 7 wherein the carbamate is selected from the group consisting of ammonium carbamate, sodium carbamate, potassium carbamate and ammonium carbonate containing ammonium carbamate.

9. The method of claim 7 wherein the step of forming the carbamate treated manganese dioxide is carried out as a pretreatment prior to preparation of the final cathode mixture.

10. The method of claim 7 wherein the step of forming the carbamate treated manganese dioxide is carried out at the preparation of the final cathode mixture.

References Cited

UNITED STATES PATENTS

| 1,275,666 | 8/1918 | Ellis et al. | 23—145 |
| 1,494,059 | 5/1924 | Burger | 136—138 |
| 1,656,091 | 1/1928 | Yngve et al. | 136—139 |
| 2,608,466 | 8/1952 | Fox | 23—145 |
| 2,739,914 | 3/1956 | Babbit et al. | 136—139 |
| 2,757,071 | 7/1956 | Welsh et al. | 23—145 |
| 2,758,012 | 8/1956 | Welsh et al. | 23—145 |
| 2,956,860 | 10/1960 | Welsh | 23—145 |
| 3,356,452 | 12/1967 | Moore | 23—145 |

WINSTON A. DOUGLAS, Primary Examiner

A. SKAPARS, Assistant Examiner

U.S. Cl. X.R.

136—139